July 1, 1924.

F. J. LARSON

REVERSING MECHANISM FOR THREAD MILLING MACHINES

Filed Oct. 23, 1920

1,499,381

Inventor
F. J. Larson.
By L. Jay Tiller
Attorney.

Patented July 1, 1924.

1,499,381

UNITED STATES PATENT OFFICE.

FREDERICK J. LARSON, OF HARTFORD, CONNECTICUT, ASSIGNOR TO PRATT & WHITNEY COMPANY, OF NEW YORK, N. Y., A CORPORATION OF NEW JERSEY.

REVERSING MECHANISM FOR THREAD-MILLING MACHINES.

Application filed October 23, 1920. Serial No. 418,830.

*To all whom it may concern:*

Be it known that I, FREDERICK J. LARSON, a citizen of the United States, residing at Hartford, in the county of Hartford and State of Connecticut, have invented certain new and useful Improvments in Reversing Mechanism for Thread-Milling Machines, of which the following is a specification.

This invention relates to thread milling machines and particularly to a safety device applied to the carriage traversing mechanism thereof to prevent breakage of the gears and undue shock or strain on the machine when the traversing mechanism is thrown into operation. In thread milling machines, means is ordinarily provided for quickly bringing the cutter carriage up to its cutting position prior to a cutting operation or for quickly retracting the carriage away from the work after finishing a cut. In the machine illustrated herein this means comprises a rapid power traversing mechanism preferably driven from the main drive shaft. When operating with the usual form of gearing the throwing into mesh of this quick-acting mechanism often results in the breakage of gears and other injury and undue strain on the machine. It is the principal object of the invention to prevent such injury to the machine and I preferably perform this object herein by a novel cooperating arrangement of the machine including the driving of this mechanism through a gear mounted frictionally on the traversing shaft. The details of the invention will be apparent from the following description taken in connection with the the accompanying drawing.

Referring to the figures of the drawing.

Figure 1:
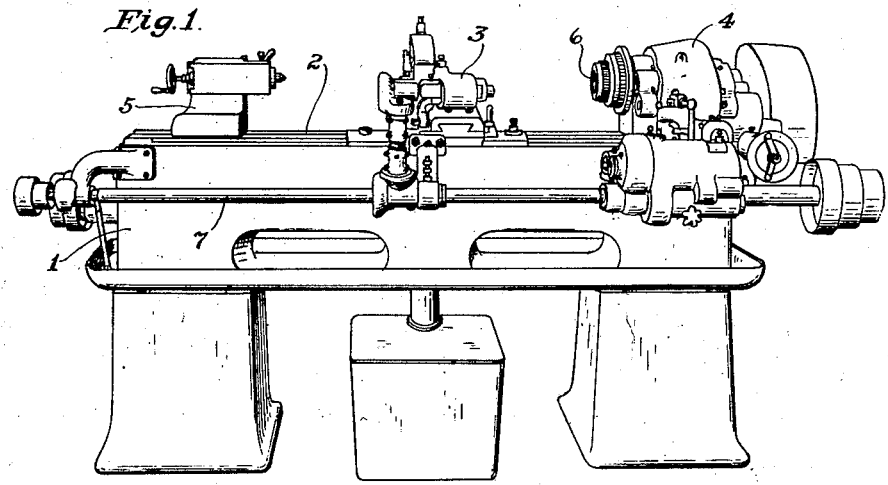
Figure 1 is a perspective view of a thread milling machine having the present invention applied thereto.

In the drawing, 1 represents the frame of the machine on the ways 2 of which is slidably mounted the cutter carriage 3. 4 and 5 respectively indicate the headstock and tailstock, the latter being adjustable on the ways 2. The work spindle 6 and the cutter spindle are rotated from the main drive shaft 7 which also drives the mechanism to move the cutter carriage along its ways 2 to be hereinafter described.

Figure 2:
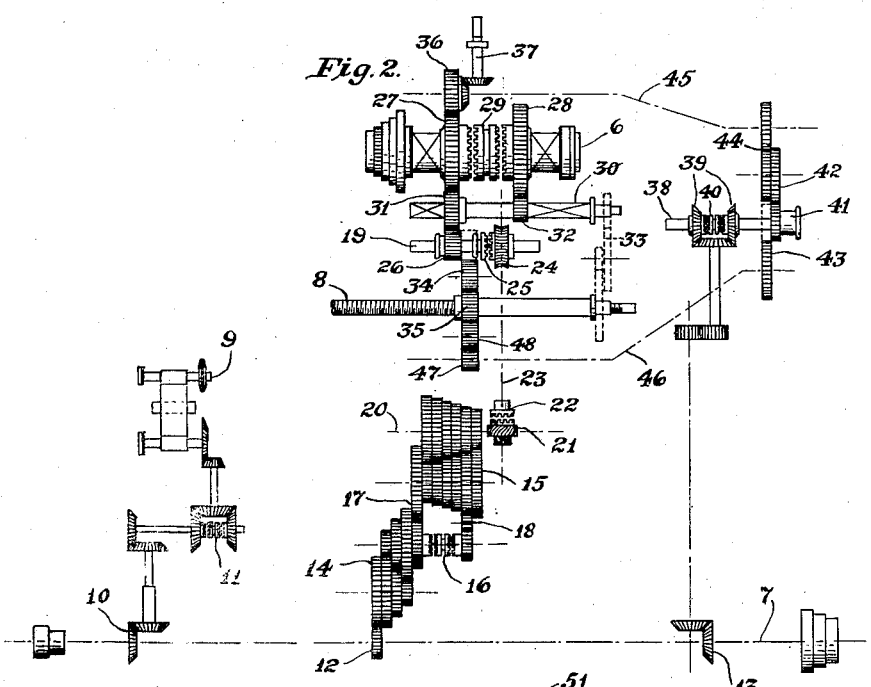
Fig. 2 is a diagrammatic view of the gearing thereof, illustrating the friction gear device used therewith.

Referring particularly to Fig. 2 wherein is illustrated diagrammaticially the gearing for driving the several parts of the machine, 6 illustrates the work spindle and 7 the main drive shaft. The screw for operating the cutter carriage along its ways is indicated at 8. The cutter spindle 9 is driven from the bevel gear 10 on the shaft 7 through the gearing illustrated, a two-way clutch 11 adapting the cutter to be driven in either direction. The work spindle 6 and screw 8 are driven from the gear 12 on the shaft 7 through the gearing illustrated and hereinafter described. The rapid traversing mechanism also hereinafter described is driven from a bevel gear 13 on the shaft 7.

Referring particularly to the mechanism for driving the work spindle 6 and the screw 8 from the gear 12, 14 and 15 represent change speed gearing and 16 an intermediate two-way clutch whereby the mechanism may be operated in one direction through the gears 17 and in the other direction through an idler gear 18. A shaft 19 is operated from the change speed gearing through shaft 20, spiral gears 21, primary feed clutch 22, shaft 23, worm and worm wheel 24, and clutch 25. The work spindle 6 and the screw 8 are both adapted to be operated from this shaft 19 and through the sliding gear 26 the drive may be directly to the spindle and other change speed gearing to the screw or directly to the screw and thence through the change speed gearing to the spindle, the particular arrangement depending upon the character of the work to be milled. Loosely mounted on the spindle are two gears 27 and 28 either adapted to be connected to the spindle by means of a two-way clutch 29. The gears 27 and 28 are operatively connected to a shaft 30 through gears 31 and 32 and change speed gearing 33 connects the shaft 30 with the screw 8. The gear 26 is splined to the shaft 19 for sliding movement into mesh with either gear 31 or gear 34 to directly drive either the spindle or the screw respectively. As illustrated in Fig. 2, the drive is through the gears 26, 31 and 27 and clutch 29 to the spindle and through the gear 31, shaft 30 and change speed gearing 33 to the screw. With the gear 26 placed in the dotted line position in mesh with gear 34, the drive is through gears 26, 34 and 35 to the screw and through the change speed gearing 33, shaft 30 and gears 31 and 27 or 32 and 28, and clutch 29 to the spindle. The spindle may be turned by hand through the gear 36 and shaft 37. The mechanism just described is for feeding the cutter carriage during the screw threading operation. The rapid traversing mechanism for the carriage will now be described.

The rapid power traversing mechanism comprises a rapid power traversing shaft 38 driven from the bevel gear 13 on the main drive shaft 7 through the mechanism illustrated. This mechanism includes two bevel gears 39 loose on the shaft 38 and driven in opposite directions. By means of the two-way clutch 40 splined to the shaft either bevel gear may be connected to the shaft to drive the same in one or the other direction. 41 indicates a friction gear splined to the shaft 38 and adapted to be placed in meshing engagement with either gear 42 or 43. When engaged with the gear 42 the drive will be through gears 42, 44, shaft 45, gear 36, gear 27, gear 31, shaft 30 and change speed gearing 33 to the screw. When engaged with the gear 43 the drive will be through gear 43, shaft 46 and gears 47, 48 and 35 to the screw. The gear 41 should be in the position shown in full lines when the gear 26 is in the position shown in full lines and likewise the correct relative positions of these gears are shown in dotted lines. It will be seen that with the gearing in the position illustrated in Fig. 2, the screw 8 is driven from the shaft 30 at a reduced speed through the change speed gearing 33. When the gear 26 is moved to its dotted line position, the drive through the speed change gearing 33 will be in the opposite direction, the gearing being so rearranged that such drive will be at a reduced speed from the screw to the shaft 30. In order that the rapid traversing drive may be in the speed reducing direction of this gearing the gear 41 must now be in the corresponding position relative to gear 26, indicated in dotted lines, whereby the drive is to the gear 43 and thence to the screw. The rapid traversing drive through the change speed gearing 33 should always be in the speed reducing direction.

Figures 3, 4:
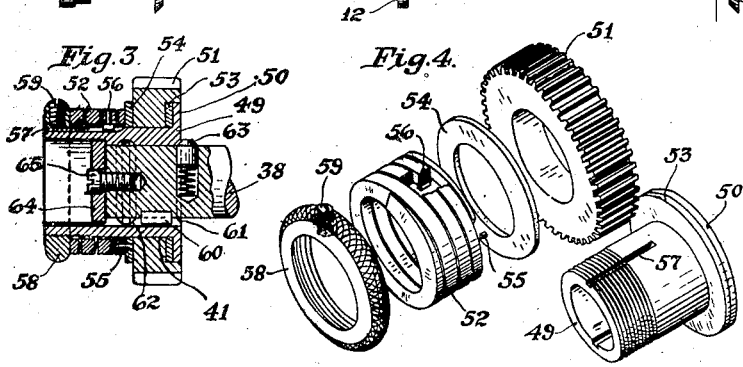
Fig. 3 is an enlarged longitudinal sectional view of the friction gear device mounted on the traversing shaft.
Fig. 4 is a view illustrating in detail the several parts comprising the friction gear device.

The general construction of the friction gear 41 is illustrated in Figs. 3 and 4 and comprises a sleeve 49 having a flange 50 at one end thereof. The gear proper 51 is mounted on the sleeve against the flange and a compression spring 52 is adapted to hold the gear tightly against the flange. Friction washers 53 and 54 are interposed between the gear and flange and spring respectively, the washer 54 being secured to the spring by means of a pin or rivet 55 as illustrated. A pin 56 is also mounted radially in the spring and enters a splined groove 57 in the sleeve whereby the spring is prevented from rotating relative to the sleeve. A nut 58 threaded on the sleeve holds the spring under compression and a set screw 59 is adapted to lock the nut against rotation. The sleeve is splined to the shaft 38 at 60 and the bore of the sleeve is beveled annularly at two spaced positions 61 and 62, such bevelled portions being adapted to receive a spring-pressed plunger 63 mounted in the shaft 38 to hold the friction gear in either of its two operating positions in meshing engagement with either gear 42 or 43. A cap 64 secured to the end of the shaft by means of a screw 65 is adapted to engage the end of the gear in its outermost position.

During the feeding and cutting operation of the machine the clutch 40 is in the neutral position illustrated. When it is desired to traverse the cutter carriage in either direction the clutch 40 is thrown into mesh with one of the bevel gears 39, the clutch 25 being in a neutral position at such time. It should be understood that in actual practice the rapid traverse clutch 40 is thrown into operation at the end of a cut without in any manner stopping or reducing the speed of the machine. The clutch 40 may be thrown into engagement while the machine is operating at full speed without danger of injury to the machine since the friction gear 41 absorbs the shock as the clutch teeth engage. Also should an obstruction prevent the traversing of the carriage, no harm will result since under such a condition the gear 51 will merely ride idly on its sleeve 49. The invention therefore provides means in combination with a thread milling machine whereby the tool carriage can, at the end of a cut, be rapidly traversed back to its initial position without delay and without fear of injury to the machine.

What I claim is:

1. In a metal working machine, the combination of a rotary work spindle, a cutter carriage movable longitudinally of the spindle, a screw for so moving the carriage, a drive shaft, operative connections including a positively acting clutch from the drive shaft to the spindle and screw, and a rapid power traversing mechanism for the screw including a rapid power traversing shaft driven from the drive shaft, a gear frictionally mounted thereon whereby breakage of the gears or undue strain on the machine is prevented when the rapid power traversing mechanism is thrown into mesh and a toothed clutch for connecting the traversing mechanism with the drive shaft.

2. In a metal working machine, the combination of a rotary work spindle, a cutter carriage movable longitudinally of the spindle, a screw for so moving the carriage, a drive shaft, operative connections including a positively acting clutch from the drive shaft to the spindle and screw, a rapid power traversing mechanism for the screw including frictional means whereby breakage of the gears or undue strain on the machine is prevented when the rapid power traversing mechanism is thrown into mesh, and a positively acting two-way clutch whereby such mechanism may be operated to traverse the carriage in either direction.

3. In a metal working machine, the combination of a rotary work spindle, a cutter carriage movable longitudinally of the spindle, a screw for so moving the carriage, a drive shaft, operative connections including a positively acting clutch from the drive shaft to the spindle and screw, a rapid power traversing mechanism for the screw including a rapid power traversing shaft and a gear frictionally mounted thereon whereby breakage of the gears or undue strain on the machine is prevented when the rapid power traversing mechanism is thrown into mesh, and a positively acting clutch on the second mentioned shaft for throwing the traversing mechanism into operation.

4. In a metal working machine, the combination of a rotary work spindle, a cutter carriage movable longitudinally of the spindle, a screw for so moving the carriage, a drive shaft, operative connections from the drive shaft to the spindle and screw arranged to either drive the spindle through the screw or the screw through the spindle operating means, and a rapid power traversing mechanism for the screw including frictional means whereby breakage of the gears or undue strain on the machine is prevented when the rapid power traversing mechanism is thrown into mesh, the mechanism being so arranged that the traversing may be done directly from the traversing mechanism to the screw or through the spindle gears thereto.

5. In a metal working machine, the combination of a rotary work spindle, a cutter carriage movable longitudinally of the spindle, a screw for so moving the carriage, a drive shaft, operative connections from the drive shaft to the spindle and screw arranged to either drive the spindle through the screw or the screw through the spindle operating means, and a rapid power traversing mechanism for the screw including a rapid power traversing shaft and a gear frictionally mounted thereon whereby breakage of the gears or undue strain on the machine is prevented when the rapid power traversing mechanism is thrown into mesh, the friction gear being slidable on its shaft into mesh with either of two gears to drive the screw directly or through the spindle gears.

6. In a thread milling machine, the combination of a rotary work spindle, a cutter carriage movable longitudinally of the spindle, a screw for moving the carriage, power means, means for directly driving either the spindle or screw from the power means, change speed gearing between the spindle and screw for driving the element not directly driven from the power means, rapid power traversing mechanism including a gear axially slidable into positions for directly driving either the spindle or screw, and means including a positively acting clutch for engaging the traversing mechanism with the power means, and the said mechanism including frictional means for preventing shock and breakage when the said clutch is engaged.

7. In a thread milling machine, the combination of a rotary work spindle, a cutter carriage movable longitudinally of the spindle, a screw for moving the carriage, power means, means for directly driving either the spindle or screw from the power means, change speed gearing between the spindle and screw for driving the element not directly driven from the power means, rapid power traversing mechanism, the said mechanism being adjustable to directly drive either the spindle or screw and including frictional means for preventing shock and breakage, and means including a positively acting double clutch for driving the traversing mechanism in either direction from the power means.

8. In a thread milling machine, the combination of a rotary work spindle, a cutter carriage movable longitudinally of the spindle, a screw for moving the carriage, power means, means for directly driving either the spindle or screw from the power means, change speed gearing between the spindle and screw for driving the element not directly driven from the power means, rapid power traversing mechanism including a frictionally mounted gear axially slidable into positions for directly driving either the spindle or screw, and means including a positively acting clutch for engaging the traversing mechanism with the power means.

In testimony whereof, I hereto affix my signature.

FREDERICK J. LARSON.